Oct. 25, 1960 W. C. JOHNSON 2,957,230
METHOD OF MAKING PLATE OR SHEET METAL
ARTICLES HAVING HOLLOW SECTIONS
Filed Aug. 1. 1955 2 Sheets-Sheet 2

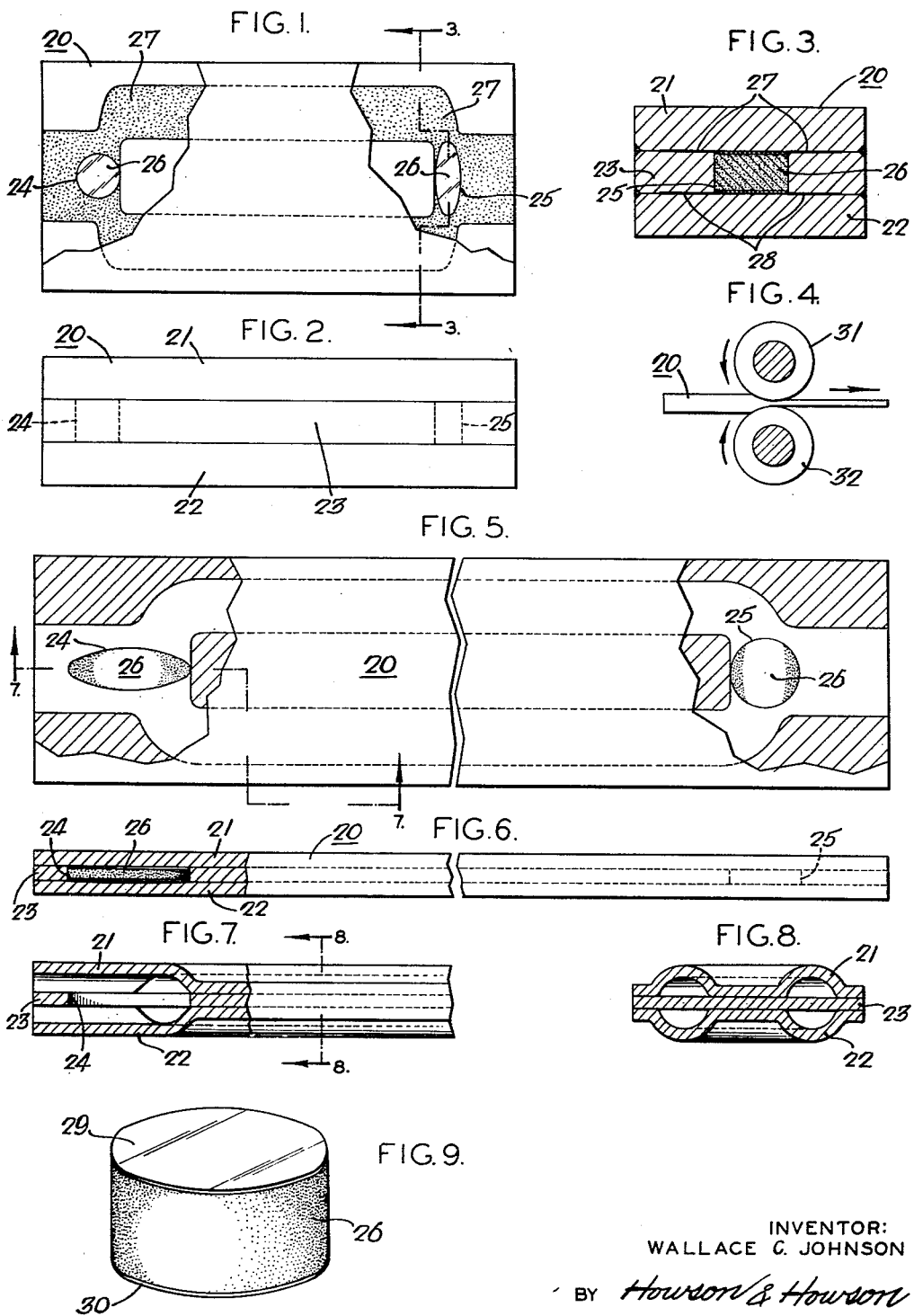

INVENTOR:
WALLACE C. JOHNSON
BY Howson & Howson
ATTYS.

United States Patent Office 2,957,230
Patented Oct. 25, 1960

2,957,230

METHOD OF MAKING PLATE OR SHEET METAL ARTICLES HAVING HOLLOW SECTIONS

Wallace C. Johnson, St. Davids, Pa., assignor to Olin Mathieson Chemical Corporation, East Alton, Ill., a corporation of Virginia Filed Aug. 1, 1955, Ser. No. 525,621

14 Claims. (Cl. 29—157.3)

This invention relates to the making of plate or sheet metal articles having hollow sections. In the past, such articles have been made by the process which involves pressure weld bonding of superposed metal members in selected areas, and inflation of said members in the unwelded areas by introduction of fluid pressure to form the hollow sections. The process is fully described in U.S. Patent No. 2,690,002, issued September 28, 1954, to L. H. Grenell, and in U.S. Patent No. 2,662,273, issued December 15, 1953, to G. R. Long. While this process has been useful for the making of various articles, such as heat exchange structures for refrigerators, it has not been applicable to the making of certain structures of more or less special character.

The principal object of this invention is to provide a process which will enable the making of structures that have heretofore been impossible to make by pressure weld bonding of superposed members in selected areas.

In the past, the process for making articles having hollow sections, involving pressure welding of superposed metal members in selected areas, has been characterized by the use of a relatively thin layer of weld-prevention material between the metal members in each area where a hollow section is to be formed by later inflation.

This invention is based on the novel concept of providing what I choose to call a cast-stop-weld to enable the provision of one or more internal voids or spaces in a pack structure and to enable both hot and cold rolling of the pack structure in the formation of the desired product. I have discovered that it is possible to roll a pack structure, either hot or cold, having voids or spaces filled by cast-stop-welds which must be capable of supporting the outer members, of the structure, without depression during a rolling operation. The cast-stop-weld is a body composed of weld-prevention material which, at hot rolling temperature, is plastic and flows with the metal of the associated members and which, during cold rolling, is equally capable of flowing with the metal. During the rolling operations, the cast-stop-weld continuously fills the internal void or space which it occupies, and it enables the hot and cold rolling of the pack structure just as though the void or space were not present.

In the practice of the present invention, the cast-stop-weld may be formed during the formation of the pack structure, e.g. by troweling and spreading, or it may be preformed as a self-supporting unit which may be inserted in the pack structure during the formation or building thereof. Where the cast-stop-weld is formed as a self-supporting unit, it is preferred to apply facings of paper or other suitable material to opposite surfaces of the unit to better adapt it for handling.

The invention may be fully understood by reference to the accompanying drawings wherein Fig. 1 is a plan view of a pack structure with a portion of the upper plate broken away;

Fig. 2 is a side elevational view of the pack structure;

Fig. 3 is a sectional view taken along line 3—3 of Fig. 1;

Fig. 4 is a simple illustration of the rolling of the pack;

Fig. 5 is a plan view similar to Fig. 1 after rolling of the pack structure to effect welding of the components and to reduce the structure to the desired final thickness;

Fig. 6 is a side elevational view of the rolled pack structure, with a portion broken away and shown in section;

Fig. 7 is a sectional view, taken along line 7—7 of Fig. 5, after inflation of the unwelded areas;

Fig. 8 is a cross sectional view taken along line 8—8 of Fig. 7;

Fig. 9 is a large scale perspective view of a cast-stop-weld unit which may be employed in a structure such as that shown in the preceding figures;

Figure 12:
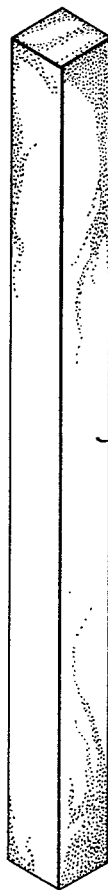
Fig. 12 is a perspective view of one of the cast-stop-weld units employed.

Referring first to Figs. 1 to 3, there is shown a pack structure 20 comprising outer metal plates 21 and 22, inner metal plate 23 having apertures 24 and 25 therein, a cast-stop-weld 26 filling each of the internal voids or spaces provided by the apertures 24 and 25, and weld-prevention material 27 and 28 in the form of thin layers between the internal surfaces of the metal members and arranged in a desired pattern as shown in Fig. 1. In this instance, the object is to provide interconnected passages in the final structure, and the purpose of the apertures 24 and 25 is to establish the desired intercommunication between the passages.

The weld-prevention material 27 and 28 may be any of the materials which have been employed in the past such as magnesium oxide, aluminum oxide, zirconium oxide, carbon, etc. depending on the kind of metal being rolled. This material may be applied to the surfaces of the metal members in the desired pattern in any suitable manner, as by painting, spraying, screening, etc.

The cast-stop-welds 26 may be inserted in the voids or spaces during formation of the pack structure by troweling and spreading, but preferably cast-stop-weld units, such as shown in Fig. 9, are preformed and are inserted into the voids or spaces during the building up of the pack structure. Preferably also the opposite planner surfaces of each cast-stop-weld unit are covered with sheets 29 and 30 of paper or other suitable material to better adapt the otherwise fragile unit for handling.

The cast-stop-welds 26, whether they are troweled into the voids or spaces or preformed as a unit for insertion in the spaces, should be composed of a suitable material or mixture which will flow with the particular metal of the associated members during both hot and cold rolling. By way of example, the cast-stop-welds may be composed of a mixture of 10% mica, 87% zirconium silicate-sand and 3% bentonite clay. The sand should be rather fine, e.g. capable of passing through a 40-mesh screen, in order that it will not objectably scratch the inner metal surfaces. The above components should be intimately mixed and the mixture slightly moistened to form a putty-like mass which may be spread or molded. Where each cast-stop-weld is preformed as a unit, the moistened mixture may be molded and then dried and baked at a temperature of approximately 300° F. The paper facings may be applied either before or after baking, as the paper will not char at the baking temperature. The facings may be cemented onto the opposed surfaces of the unit by any suitable cement such as silicate of soda (water glass). The cast-stop-welds can also be made by forming a sheet as by rolling the material into sheet form and then stamping or cutting the stop-welds from the sheet.

After formation of the pack structure, such as shown in Figs. 1 to 3, it is integrated sufficiently to hold it together for handling. This may be done by spot welding the corners of the pack or by diffusion welding along the edges thereof, as in prior treatment of pack structures. The structure is then heated in a furnace to a suitable temperature for pressure weld bonding of the metal members in the areas other than those covered by weld-prevention material. The temperature to which the structure should be heated depends upon the material of which the metal members are composed. In the case of steel, a temperature of approximately 2000° to 2300° F. is necessary. In the case of copper, a temperature of approximately 1600° to 1800° F. is necessary, although alloys of copper will weld at lower temperatures in the neighborhood of 1300° F. In the case of aluminum, a temperature of approximately 900° to 1050° F. is necessary. In some instances, the inner metal member 23 may be composed of a lower melting metal than the outer members, and in such cases welding will occur at about the welding temperature of the inner member. This welding at a lower temperature is very desirable as it reduces surface oxidation and it also requires less time of operation of the heating furnace.

After such heating of the pack structure, it is rolled by means of pressure rollers such as shown at 31 and 32 in Fig. 4. The hot rolling of the pack structure effects the desired welding of the metal members and it also reduces the thickness of the structure as may be seen in Fig. 4. As in any process of this general nature, after hot rolling the structure is subjected to cold rolling to reduce it to the final desired thickness. Figs. 5 and 6 show the structure after the rolling operations during which the structure has been rolled lengthwise. The rolling causes elongation of the structure but does not appreciably affect the width thereof. The rolling also distorts each cast-stop-weld 26 and the void or space filled thereby from the original shape. Where the original shape is circular, the rolling causes it to become elliptical, and where it is originally elliptical the rolling causes it to become circular. Therefore, the space-creating apertures and the associated cast-stop-welds may be shaped so as to roll to the desired final shape of the passages desired in the finished product. For example, it may be desired to provide in the finished product a passage having a special shape, such as a venturi shape. In such case, the internal void or space and the cast-stop-weld may be shaped accordingly to produce the desired final shape after rolling.

During rolling of the structure, each cast-stop-weld 26 flows to about the same extent as does the metal of the associated members. At the hot rolling temperature the cast-stop-weld is plastic, and while it may not be plastic during cold rolling it nevertheless will flow to about the same degree during both hot and cold rolling. In the case of the mixture given above as an example, the mica is in the form of flakes and permits the material to flow or slip during cold rolling without cutting the metal of the associated members.

After completion of the rolling operations, the unwelded areas of the structure are inflated by introduction of fluid pressure in the same manner that this has been done in the past, as fully described in the above mentioned patents. The inflation may be performed with or without the use of restraining dies, depending upon the degree of inflation desired. Figs. 7 and 8 show the character of the illustrated structure after the inflation operation has been performed. After at least some inflation, the stop-weld material is easily removed by flushing it out of the formed passages with a stream of water under pressure. In the final structure shown in Figs. 7 and 8, the apertures 24 and 25 serve to interconnect upper and lower passages.

When I first conceived the cast-stop-weld and the possible use thereof in a pack structure having internal voids or spaces, it appeared to be impractical because it was thought to be impossible to handle, heat and roll the pack structure without causing some of the material of the cast-stop-weld to flow or ooze between the metal surfaces to be welded. It also seemed doubtful that the cast-stop-weld could be removed so as to leave the desired internal spaces. It was a surprising discovery, therefore, when I found from experimentation that a mixture such as that above mentioned can be used successfully in the cast-stop-weld without entering between the metal surfaces to be welded, and that the material can be easily removed after some inflation of the metal. The bentonite clay acts as a binder and holds the cast-stop-weld together, preventing it from oozing between the metal surfaces to be welded, and yet the bentonite clay readily washes out along with the mica and sand which has been further reduced in particle size by the pressure of hot and cold rolling.

Figure 10:
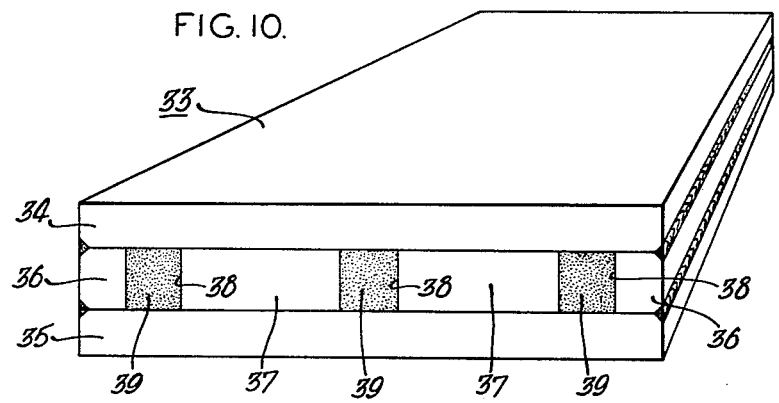
Fig. 10 is a perspective view of another pack structure for forming a different product.

Fig. 10 shows a pack structure 33 comprising outer metal plates 34 and 35, inner metal members 36 and 37 of substantial thickness defining internal voids or spaces 38 of substantial volume, and cast-stop-welds 39 filling said spaces. In this instance, each cast-stop-weld is preferably preformed as a unit, one of which is shown in Fig. 12. The cast-stop-welds should be formed of suitable material such as that previously mentioned.

After formation of the pack structure, it is corner or edge welded to integrate it sufficiently to hold it together for handling. The pack structure is then heated to a sufficient temperature to enable pressure welding of the associated metal members. It is then hot rolled to effect the weld bonding of the metal members and to reduce the thickness of the structure. It may then be cold rolled to reduce it to the desired final thickness. Then the structure may be partially inflated in the areas of the voids or spaces to enable removal of the cast-stop-welds 39 by flushing or washing with a stream of water under pressure, after which the structure may be rolled to uniform thickness.

Figure 11:
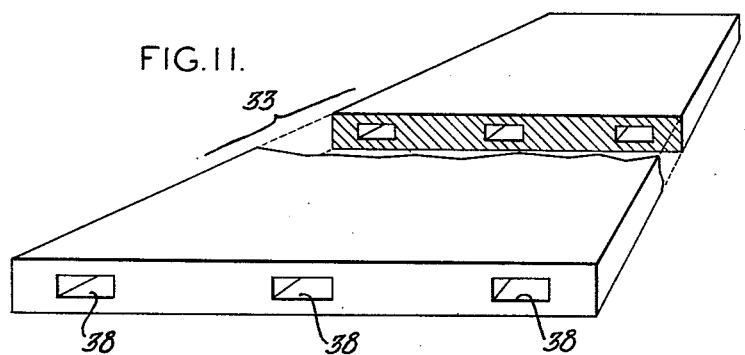
Fig. 11 is a perspective view of the structure after rolling, with a portion broken away.

Fig. 11 shows the final structure which is in the form of a plate or sheet having the longitudinal passages 38 extending therethrough.

Figure 13:
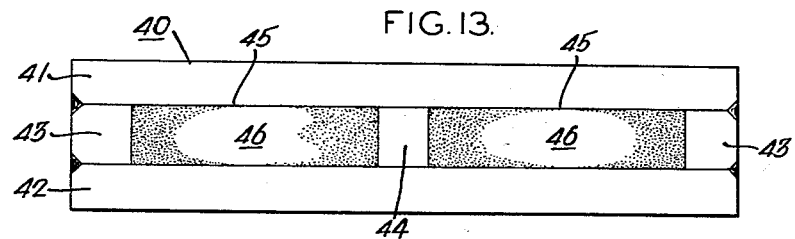
Fig. 13 is an end view of still another pack structure.

Fig. 13 shows a pack structure 40 comprising outer metal plates 41 and 42, inner metal members 43 and 44 defining internal voids or spaces 45, and cast-stop-welds 46 filling said spaces. The cast-stop-welds are composed of suitable material such as the mixture previously mentioned.

Figure 14:
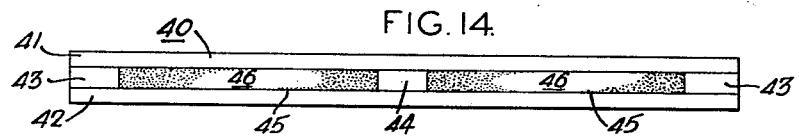
Fig. 14 is a similar view of the same after rolling.

After formation of the pack structure, it is corner or edge welded to integrate it sufficiently for handling. It is then heated and rolled, being cold rolled to the desired final thickness. Fig. 14 shows the structure after the rolling operations.

Figure 15:
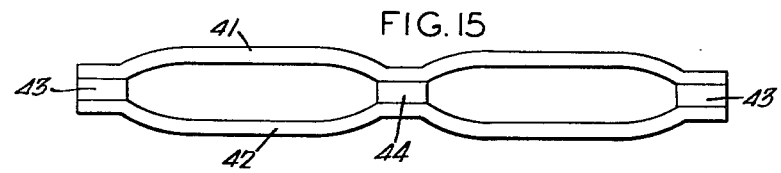
Fig. 15 is a similar view after inflation and removal of the stop-weld material.

In this instance, it is desired to form an article having some inflation of the hollow sections. Fig. 15 shows the structure after inflation of the hollow sections between restraining dies, and after removal of the stop-weld material. The latter is readily washed out after the inflation has been performed.

While certain forms of the invention have been illustrated and described, the invention is not limited thereto but contemplates such other embodiments as may occur to those skilled in the art.

I claim:

1. A method of making hollow articles having passageways lying in planes one above the other and interconnected to each other comprising in combination the steps of providing two outer metal component sheets, interposing an intermediate metal component sheet between said outer component sheets to form a pack structure, placing stop-weld material in pattern form between said outer component sheets and the said intermediate component sheet so as to define two different series of patterns with said stop-weld material being flowable under pressure, providing an aperture with stop-weld material therein in said intermediate component sheet interconnecting both series of said patterns, heating said pack structure to pressure welding temperatures, pressure welding all said component sheets in their adjacent areas not separated by said stop-weld material, and injecting into the unwelded areas of said sheets a fluid pressure of sufficient magnitude to expand said unwelded areas.

2. The method of claim 1 including the steps by which said stop-weld material in pattern form is placed between said outer component sheets and said intermediate component sheet comprising, applying to one of the faces of each pair of component sheets to be disposed adjacent each other in said pack structure one of said series of patterns of said stop-weld material, and including the steps by which said aperture is provided with stop-weld material therein comprising, depositing said stop-weld material into said aperture contained in said intermediate component sheet to be interposed between said outer component sheets.

3. The method of claim 2 wherein each of said series of patterns defines a desired system of tubular passageways.

4. The method of claim 2 wherein said pressure welding is accomplished by rolling said pack structure between mill rolls, and said aperture has an elliptical configuration with its major axis perpendicular to the direction of said rolling.

5. The method of claim 4 wherein each of said series of patterns defines a desired system of tubular passageways.

6. The method of claim 2 including the step of reducing the thickness of the welded sheets subsequent to said pressure welding and subsequent to said expansion to the desired final thickness.

7. The method of claim 6 wherein each of said series of patterns defines a desired system of tubular passageways.

8. The method of claim 2 including the steps for providing said aperture with stop-weld material therein comprising forming a stop-weld unit having a configuration corresponding to the configuration of said aperture from stop-weld material flowable under pressure, and inserting said unit into said aperture.

9. A method of making hollow articles having passagesways lying in planes one above the other and interconnected to each other comprising in combination the steps of providing two outer metal component sheets, interposing an intermediate metal component sheet between said outer component sheets to form a pack structure, placing stop-weld material in pattern form between said outer component sheets and the said intermediate component sheet so as to define two different and separate series of patterns with said stop-weld material being flowable under pressure, providing an aperture with stop-weld material therein in said intermediate component sheet interconnecting both series of said patterns, heating said pack structure to pressure welding temperatures, pressure welding all said component sheets in their adjacent areas not separated by said stop-weld material, injecting into unwelded areas of said sheets a fluid pressure of sufficient magnitude to expand said unwelded areas, and removing said stop-weld material from said unwelded areas.

10. The method of claim 9 including the steps by which said stop-weld material in pattern form is placed between said outer component sheets and said intermediate component sheet comprising, applying to one of the faces of each pair of component sheets to be disposed adjacent each other in said pack structure one of said series of patterns of said stop-weld material, and including the steps by which said aperture is provided with stop-weld material therein comprising, depositing said stop-weld material into said aperture contained in said intermediate component sheet to be interposed between said outer component sheets.

11. The method of claim 9 wherein each of said series of patterns defines a desired system of tubular passageways.

12. The method of claim 11 including the step of reducing the thickness of the welded sheets subsequent to said pressure welding and prior to said expansion to the desired final thickness.

13. The method of claim 12 wherein said pressure welding is accomplished by rolling said pack structure between mill rolls, and said aperture has an elliptical configuration with its major axis perpendicular to the direction of said rolling.

14. The method of claim 13 including the steps for providing said aperture with stop-weld material therein comprising forming a stop-weld unit having a configuration corresponding to the configuration of said aperture from stop-weld material flowable under pressure, and inserting said unit into said aperture.

References Cited in the file of this patent

UNITED STATES PATENTS

| | | |
|---|---|---|
| 377,317 | Marshall | Jan. 31, 1888 |
| 726,026 | Canda | Apr. 21, 1903 |
| 1,127,041 | Lloyd | Feb. 2, 1915 |
| 1,938,633 | Maskrey | Dec. 12, 1933 |
| 2,190,494 | Templin | Feb. 13, 1940 |
| 2,498,275 | Johnson | Feb. 21, 1950 |
| 2,662,273 | Long | Dec. 15, 1953 |
| 2,690,002 | Grenell | Sept. 28, 1954 |
| 2,759,246 | Campbell | Aug. 21, 1956 |
| 2,772,180 | Neel | Nov. 27, 1956 |

FOREIGN PATENTS

| | | |
|---|---|---|
| 1,467 | Great Britain | Jan. 31, 1888 |
| 401,476 | Germany | Sept. 8, 1924 |